United States Patent [19]
Kain, III et al.

[11] Patent Number: 5,832,501
[45] Date of Patent: Nov. 3, 1998

[54] METHOD AND SYSTEM FOR FILTERING FILE MANAGER ATTRIBUTE VALUES

[75] Inventors: William P. Kain, III, San Jose; Prashant Patel, Fremont; Donald J. Brady, San Jose; Mark Day, Saratoga; Susan A. Manning, Boulder Creek, all of Calif.

[73] Assignee: Apple Computer, Inc., Cupertino, Calif.

[21] Appl. No.: 775,599

[22] Filed: Dec. 31, 1996

[51] Int. Cl.$^6$ .................................................. G06F 17/30
[52] U.S. Cl. ............................... 707/103; 707/1; 707/7; 707/200; 707/203; 707/205; 707/20
[58] Field of Search ................................. 707/1, 7, 200, 707/203, 202, 205, 103; 711/113; 395/62, 671, 703

[56] References Cited

U.S. PATENT DOCUMENTS

| | | | |
|---|---|---|---|
| 5,327,559 | 7/1994 | Priven et al. | 395/671 |
| 5,363,487 | 11/1994 | Willman et al. | 395/828 |
| 5,371,885 | 12/1994 | Letwin | 707/205 |
| 5,504,843 | 4/1996 | Catapano | 395/115 |
| 5,526,257 | 6/1996 | Lerner | 705/10 |
| 5,535,375 | 7/1996 | Eshel | 345/500 |
| 5,557,732 | 9/1996 | Thompson | 345/329 |
| 5,574,903 | 11/1996 | Szymanski et al. | 707/1 |

Primary Examiner—Thomas G. Black
Assistant Examiner—Diane D. Mizvahi
Attorney, Agent, or Firm—Burns, Doane, Swecker & Mathis, L.L.P.

[57] ABSTRACT

In a computer including at least one client and at least one file system having an associated format, a system and method are provided for filtering requests for metadata from the client in a manner which is transparent to the client. An interface receives the client's request for metadata from the file system and forwards the request to a dispatcher. The dispatcher forwards the request to a format agent which fulfills the request. A third party filter system filters the requested metadata. If the filter system requires metadata to perform the filtering, the filter system requests additional metadata, and the format agent fulfills the client's request and the filter system's request. The format agent fulfills portions of the client's request and the filter system's request regarding metadata which is contained in the associated format of the file system directly from the file system. The format agent accesses a storage means to fulfill portions of the client's request and the filter system's request regarding metadata which is not included in the associated format of the file system. If the client's request is to write or modify metadata, the filter system filters metadata to be written or modified by the format agent. If the client's request is to retrieve metadata, the filter system filters metadata retrieved by the format agent. In this manner, third parties can modify metadata which is requested by a client from a file system or compute metadata based on the client's request without altering the format of the file system and can benefit from the modification and/or computation of such metadata by other parties.

12 Claims, 9 Drawing Sheets

METHOD AND SYSTEM FOR FILTERING FILE MANAGER ATTRIBUTE VALUES

The present invention relates to a method and a system for filtering file manager attribute values. More particularly, the present invention relates to a method and system for transparently filtering, by at least one third party, attribute values requested by a client.

BACKGROUND

A typical computer system comprises a central processing unit, memory, peripheral devices such as data input/output devices and storage media such as floppy disks or hard disks. The devices communicate with each other via a computer operating system.

Computer operating systems include several different operational modules. One such module is the file manager. Client data stored on a storage medium is organized as a file system having an associated format, and the file manager controls the access to the file systems. The file manager provides file system access to clients using various software via Application Programmer Interfaces (APIs) adapted to the software. For example, the file manager may include an Apple Computer, Inc. API to interface with Apple software or an MS-DOS INT 21 API to interface with DOS software.

The file system stores, organizes and describes client data. The client data is stored in files. The files are arranged in each file system in a particular format. Each file system maintains its organization and description information, referred to as metadata, in format specific structures. Examples of such formats are HFS, MS-DOS FAT, ProDOS, High Sierra, ISO 9660, NTFS, and so on. The term format encompasses both physical disk format and network server access protocols. To read and write data from and to the file system, the file manager must be able to recognize the format of the file system.

There may be a need to permit third parties, such as service providers, to modify and/or compute metadata which is requested by a client from a file system having a particular format for various reasons, e.g., to translate data into a form suitable for the client. In addition, there may be a need to respond to a request from a client for data from a file system having a particular format with data that is not contained in the format of the file system, e.g., to add additional metadata. Preferably, these functions would be performed without altering the format of the file system.

Computer systems have been developed which permit third parties to modify and/or compute metadata requested from a file system having a particular format. Such systems typically do not have a centralized plan for permitting third parties to perform these functions. Thus, the procedures that must be followed to perform these functions are complex. In addition, the parties which manipulate and/or compute the metadata are unable to benefit from the manipulation and/or modification of the metadata by other parties.

Thus, there is a need for a system that provides a centralized technique for permitting third parties to modify and/or compute metadata which is requested by a client from a file system having a particular format without altering the format of the file system and to benefit from the manipulation and/or modification of such metadata by other parties.

SUMMARY

It is an object of the present invention to provide a means by which third parties can modify and/or compute metadata based on a client's request for metadata from a file system having a particular format without altering the format of the file system and in a manner transparent to the client. It is a further object of the present invention to provide a means by which third parties can benefit from the modification and/or computation by other parties of metadata requested by a client from the file system. According to the present invention, this and other objectives are met by a system and a method for filtering metadata requested by a client from at least one file system having an associated format.

According to an exemplary embodiment of the present invention, an interface receives the client's request for metadata from the file system and forwards the request to a dispatcher. The dispatcher forwards the request to a format agent which fulfills the request. A third party filter system filters the requested metadata. If the filter system requires metadata to perform the filtering, the filter system requests additional metadata, and the format agent fulfills the client's request and the filter system's request. The format agent fulfills portions of the client's request and the filter system's request regarding metadata which is contained in the associated format of the file system directly from the file system. The format agent accesses a storage means to fulfill portions of the client's request and the filter system's request regarding metadata which is not included in the associated format of the file system. If the client's request is to write or modify metadata, the filter system filters metadata to be written or modified by the format agent. If the client's request is to retrieve metadata, the filter system filters metadata retrieved by the format agent.

DETAILED DESCRIPTION

The present invention is directed to a system and method for filtering metadata requested by a client from a file manager in a file system. The file manager includes a dispatcher, multiple application programmer interfaces (APIs) that receive requests from clients, multiple format agents for accessing storage media organized according to file system formats, a common shared library, and a file system attribute store (FSAttribute Store) for storing attributes that may be accessed by the format agents to fulfill a request that cannot be fulfilled by the format agent. The file manager also contains an attribute filter system to filter the requested metadata, permitting third parties to modify and/ or compute the requested metadata.

According to one embodiment, all of the data in a file system is stored in one of two kinds of structures: attributes (or metadata) or forks. Forks are referred to as "coarse grain" data structures in that they contain undifferentiated items of client data. Attributes are referred to as "fine grain" data structures in that they contain characterizations of the client data stored, for example, in the forks. The metadata attributes are the structures with which the system and method for filtering, according to one embodiment of the present invention, are concerned.

According to one embodiment, attributes are descriptive metadata which are associated with a particular file system unit, e.g., a volume, directory, file, or fork. All such descriptive information is accessed as attributes, regardless of how or whether it is actually stored. Thus, names, privileges, a file's type and creator, a fork's length in bytes, etc. can all be accessed as attributes. The interpretation of certain attributes may be defined, and individual file systems may place restrictions on what attributes may be associated with what kinds of units.

Attributes provide information about the client data which may be useful to other software accessing the client data, such as, the author, type of document, size of the client data, etc. According to one embodiment, attributes can be defined by programmers as necessary. In particular, attributes are used to store metadata items which need to be accessed by software other than the program which created the attribute (or owns the entity to which the attribute is attached). Attributes can be associated with any of the persistent structures in a file system, e.g., volumes, directories, files, and forks; and it is assumed that there can be a large number of attributes associated with each structure.

Specific attributes are identified by an identifier. In one embodiment, this identifier is referred to as an FSAttribute. The FSAttribute contains information identifying one attribute from the set of metadata (or attributes) provided by a software library or service. The FSAttribute also contains information identifying an instance of the attribute.

In one embodiment, attributes are used to provide access to all of the file system metadata. Everything the operating system knows about the persistent structures in a file system can be accessed by way of attributes.

Figure 1:
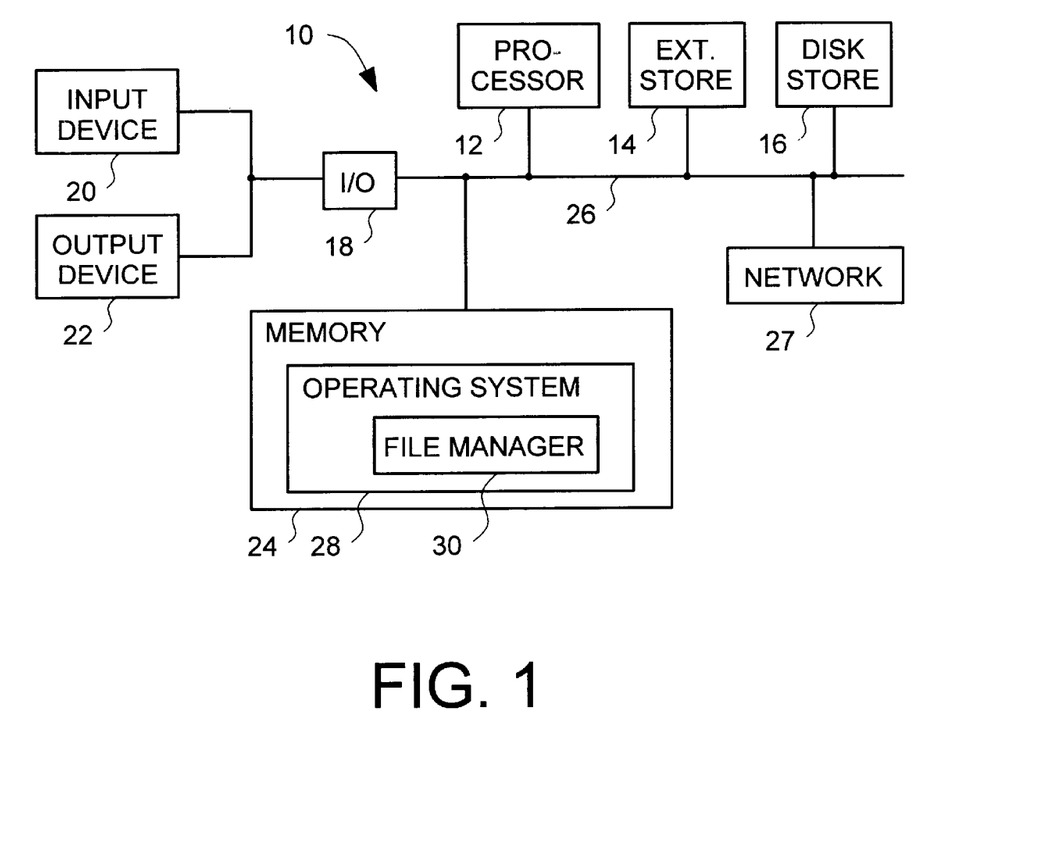
FIG. 1 is a block diagram showing an exemplary computer in which the present invention can be implemented.

FIG. 1 is a block diagram showing an exemplary computer in which the present invention can be implemented. The computer 10 includes a processor (CPU) 12, an external storage device 14, a disk storage device 16, an input/output (I/O) controller 18, an input device 20, an output device 22, a memory 24, and a common system bus 26 connecting each of the above elements. Only one input device and one output device are shown in FIG. 1 for ease of illustration. However, it will be appreciated that the computer can include more than one such device. The processor 12, the external storage device 14, the disk storage device 16 and the memory 24 are also connected through the bus 26, and the I/O controller 18 is connected to the input and the output devices 20 and 22. In addition, the computer 10 can also be adapted for communicating with a network 27.

Stored within the memory 24 of the computer 10 are a number of pieces of software which can be executed by the processor 12. One of those pieces of software is an operating system 28. In one embodiment, the operating system 28 is a microkernel operating system capable of maintaining multiple address spaces. A file manager 30 resides within the operating system 28. The file manager manages file systems. In an exemplary embodiment, the computer system of the present invention is an Apple Macintosh™ computer system made by Apple Computer, Inc., of Cupertino, Calif., having a microprocessor and a memory, wherein a microkernel operating system that includes the file manger 30 resides. The components of the computer system can be changed within the skill of the ordinary artisan once in possession of the instant disclosure. Although the present invention is described in a Macintosh™ environment, it is within the scope of the invention, and within the skill of the ordinary skilled artisan, to implement the invention in a DOS, Unix, or other computer environments.

According to one embodiment, the present invention is part of an operating system with a microkernel architecture and assumes that the kernel will provide the following services. The kernel handles address space management such that all the file system's shared metadata structures are mapped into all the address spaces in which the file system's code exists. This can be provided by mapping all the code and metadata into a single address space. The kernel should also provide task creation and notification of task termination, a semaphore synchronization mechanism and a messaging system that provides multiple objects to which messages may be sent. The messaging system allows a creator defined value to be associated with each object, multiple objects to be mapped to the same port, messages to be either received from a port or function called when a message of an appropriate type is sent to an object on that port, and allows the receiver of the message to determine to which object the message was originally sent and to derive the creator defined value for that object. One example of such a microkernel architecture is provided by NuKERNEL™, as referenced in U.S. patent application Ser. No. 08/245,141, now U.S. Pat. No. 5,574,903 filed on May 13, 1994 and herein incorporated by reference.

According to the one embodiment of the present invention, messages are sent between a client and a server. A service is provided by a server and software wishing to make use of the service is the client of the server. Messages are sent to a target object by clients and received by servers. The message directs the server to perform a function on behalf of the client. Message objects are abstract entities that represent various resources to messaging system clients. These objects may represent, for example, volumes, forks, or files managed by a server and also connections to these entities.

Message ports are abstract entities that represent a service. These ports may represent, for example, a device driver, a file manager, or a window manager. Servers receive messages from ports. Objects are assigned to a port. A message sent to an object is received from that object's port. Ports and objects are created by the messaging system on behalf of a server. The creation of an object requires designating a port from which messages sent to the object will be retrieved. The objects and ports are used in one embodiment of the present invention to establish communication between the various components of the file manager.

Figure 2:
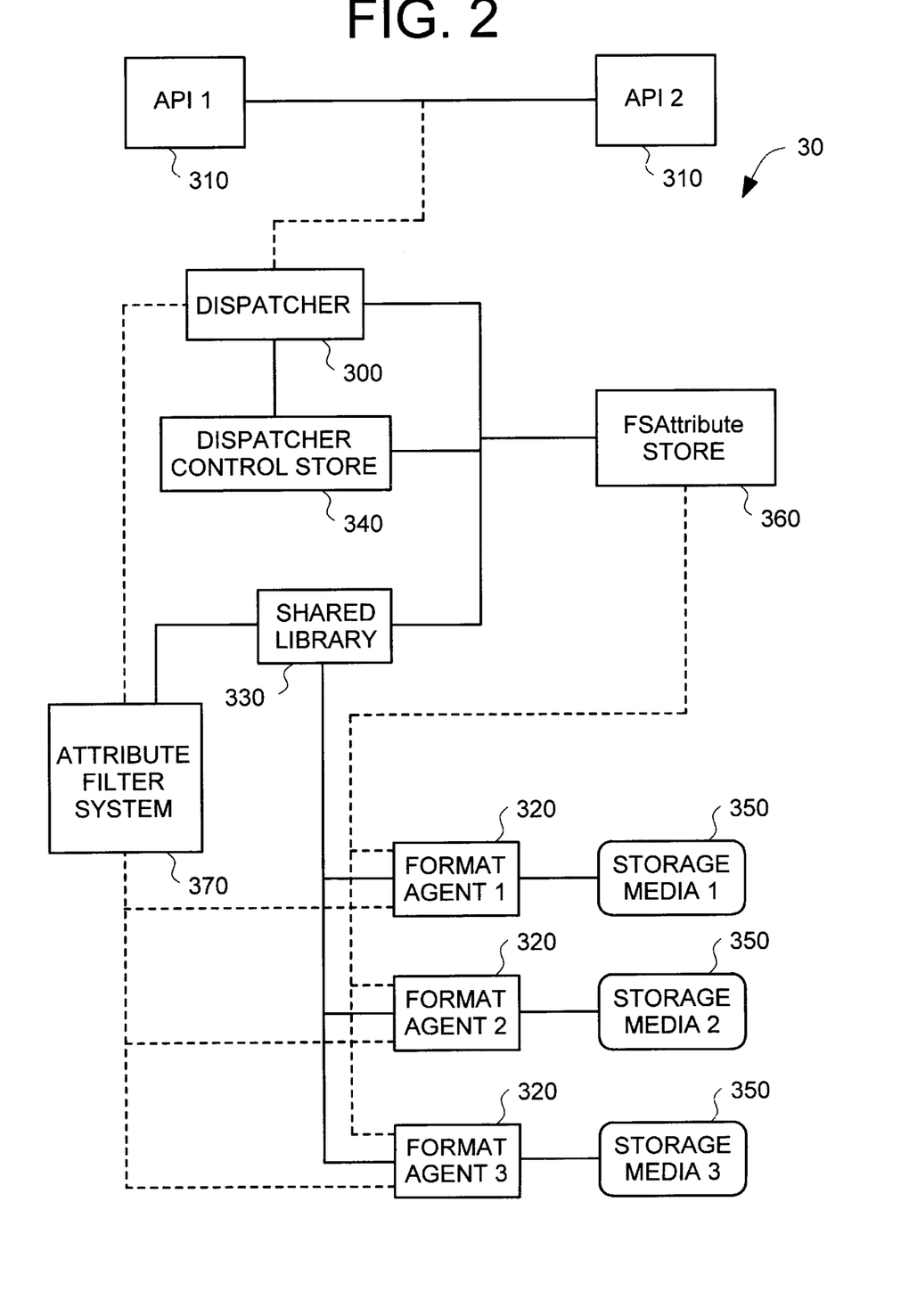
FIG. 2 illustrates a general block diagram of a file manager according to the present invention.

FIG. 2 illustrates a general block diagram of the file manager 30 according to one embodiment of the present invention. The file manager can be viewed as a collection of independently loadable modules including a dispatcher 300, application programmer interfaces (APIs) 310, format agents 320, a shared library 330, a dispatcher store 340, a file system attribute store (FSAttribute Store) 360, and an attribute filter system 370. The dashed lines in FIG. 2 indicate request messages. The solid lines indicate direct invocations.

The APIs 310 present different public interfaces to other modules of the system. Software that is written for specific environments can use the interfaces that are standard in that environment. For example, a UNIX API can be used with UNIX software, and a DOS API can be used with DOS software. The interface modules interface between the client software and the file manager by translating requests from the clients into normalized requests. Although two APIs, API 1 and API 2 are shown in FIG. 2, any number of APIs may be provided.

The dispatcher control store 340 includes storage structures that store an identifier to identify each format agent, an identifier to identify the objects assigned to the dispatcher port, and mapping information for mapping between the format agent identifiers and the object identifiers. According to one embodiment, the dispatcher control store 340 is conceptually part of the dispatcher 300. The dispatcher 300 receives normalized request messages from the APIs 310 and uses the mapping information contained in the dispatcher control store 340 to determine which format agent is able to satisfy the request. It then forwards the request messages to the appropriate format agent 320. Although three format agents 1, 2 and 3 are shown, it is appreciated that any number of format agents can be included.

According to one embodiment, each format agent can access storage media according to a particular file system format. For example, as shown in FIG. 2, format agent 1 can access storage media 1 and 2 having the same associated file system format, and format agent 3 can access storage media 3 having a different associated file system format. Although shown in FIG. 2 as separate entities, the storage media may be part of the same physical entity. For example, there may be one storage medium shared by all the format agents. In such a case, the storage medium is logically divided into separate portions, and each format agent manages one of the portions.

The appropriate format agent 320 receives the messages from the dispatcher 300 and processes the requests, thereby interfacing between the operating system, in particular the file manager, and the storage media being accessed. When the request is completed, the format agents 320 reply to the dispatcher 300 with any information that needs to be returned to the original caller. Once all the format agents 320 involved with fulfilling the request have completed the request and replied to the dispatcher 300, the dispatcher 300 returns the fulfilled requests to the API 310 that was used to initiate the request, sending any information that needs to be returned to the client. The API 310 translates that information into a form that is appropriate to the interface, and returns the translated information to the client.

Since parts of the internal mechanisms of the format agents 320 are similar between different modules, the file manager according to the present invention can include a shared library 330 that can be used by all the format agents 320. This library includes implementations of common mechanisms that can be shared between format agents 320, therefore making it easier to develop these modules. The shared library 330 also includes the software routines required by the format agents 320 to allow the agents to build the storage structures which form the dispatcher control store 340.

The shared library 330 is also used by the dispatcher 300 to access the dispatcher control store 340. The shared library 330 includes software routines for this purpose.

The file manager 30 also contains an FSAttribute Store 360. The FSAttribute Store 360 contains a collection of logic code and metadata associating arbitrary metadata with objects. The FSAttribute Store 360 is capable of storing attributes that are not part of the native volume formats. This makes it possible to add attributes to a volume format in response to requests from a client, without affecting the volume, so that the volume is still usable in the machine for which it was originally intended to be used.

According to one embodiment of the present invention, an attribute filter system 370 is arranged between the dispatcher 300 and the format agents 320. The attribute filter system 370 enables third parties to filter, i.e., modify and/or compute, attribute values requested by a client from a file system having a particular format. The attribute filter system is format independent and enables third parties to benefit from the filtering of attribute values by other parties.

When a client requests to retrieve or to set an attribute value, the request is forwarded by the dispatcher 300 to the appropriate format agent 320 via the attribute filter system 370.

If the request is to retrieve attribute values, the attribute filter system 370 filters attribute values retrieved by the format agent 320. If the attribute filter system 370 needs more attribute values to perform the filtering, it requests additional attribute values. The format agent 320 fulfills portions of the client's request and the attribute filter system's request regarding attributes that are included in the format associated with the file system. To fulfill portions of the client's request and the attribute filter system's request regarding attributes that are not included in the format associated with the file system, the format agent 320 sends a request message to the FSAttribute Store 360 for the attributes. The attribute values are retrieved from the FSAttribute Store 360 using identifying information, described in detail in U.S. patent application Ser. No. 08/644,872, filed May 10, 1996, and herein incorporated by reference pending. The attribute values are associated with an object and returned to the format agent 320. The retrieved attribute values requested by the client are filtered by the filter system 370 utilizing the additional attribute values requested by the attribute filter system. The filtered attribute values are returned to the dispatcher 300. Finally, the fulfilled request is returned to the client.

If the client's request is to set an attribute value, the attribute filter system 370 filters the attribute values to be set. If more attribute values are needed by the filter system 370 to perform the filtering, the filter system 370 requests additional attribute values in a similar manner as that described above. The format agent 320 fulfills the attribute filter system's request, returning attribute values to the filter system 370. The filter system 370, in turn, filters the attribute values to be set utilizing the client's request based on the attribute values returned by the format agent 320. Finally, the filtered metadata is forwarded to the format agent 320, and the format agent sets the metadata.

The filtering performed by the filter system 370 is transparent to the client. That is, the filtering is performed independently of the client with no input from the client except for the client's request.

Figure 3A:
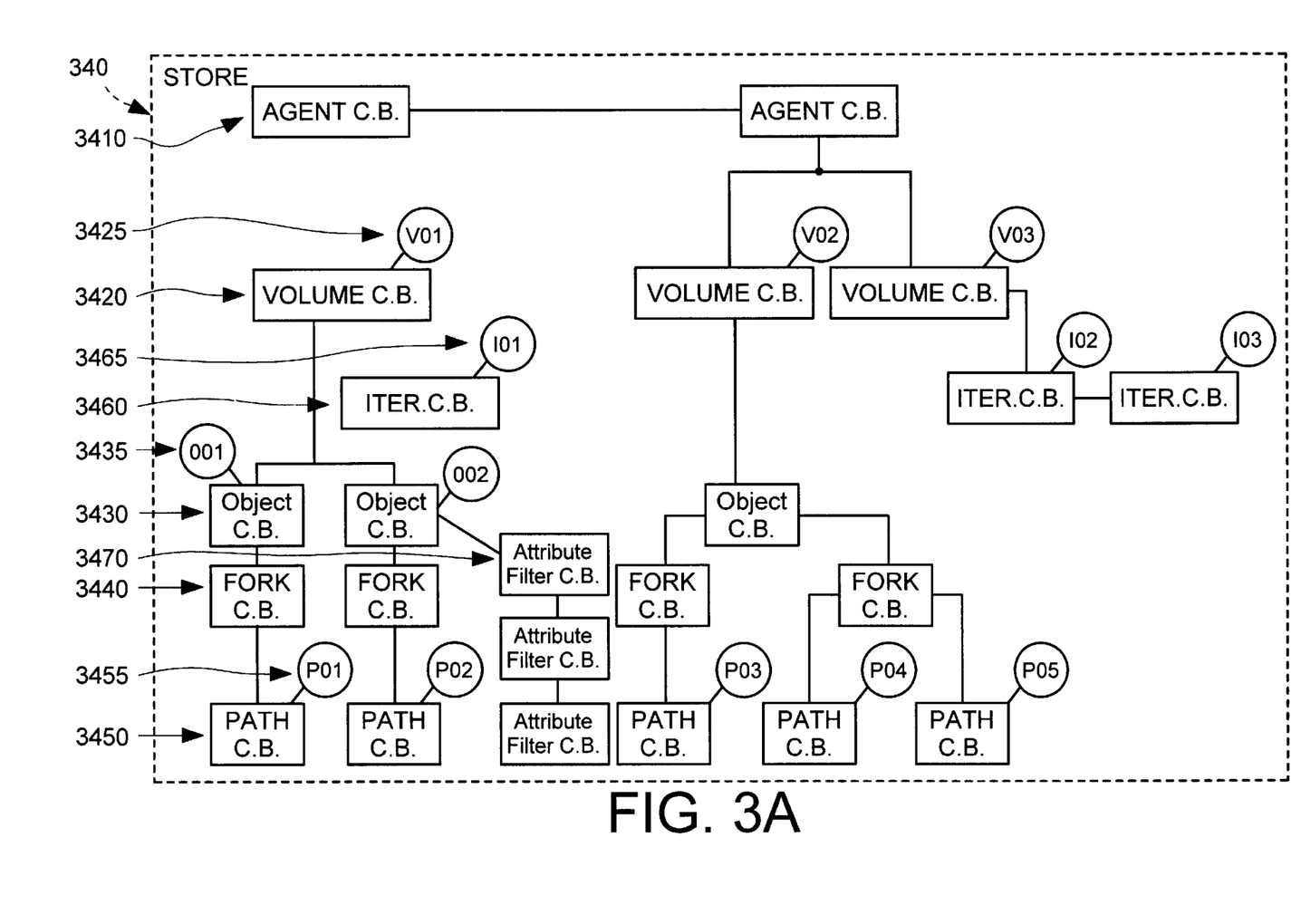
FIG. 3a illustrates a block diagram of a dispatcher control store according to the present invention.

According to one embodiment, the dispatcher control store 340 comprises a plurality of control blocks as illustrated in FIG. 3. The control blocks include agent control blocks (agent C.B.) 3410, volume control blocks (volume C.B.) 3420, file system object control blocks (FSObject C.B.) 3430, fork control blocks (fork C.B.) 3440, path control blocks (path C.B.) 3450, iterator control blocks (iterator C.B.) 3460, and attribute filter control blocks (attribute filter C.B.) 3470.

The file manager according to one embodiment of the present invention uses control block structures stored in memory to maintain the runtime state for the file system entities it manages (e.g., volume formats, volumes, objects, forks, paths, iterators, and attribute filters) and to maintain in memory copies of frequently accessed information relating to these file system entities. In addition, each of these control blocks includes a semaphore which is used to coordinate the activities of the request processing tasks (RPTs).

According to one embodiment, these control blocks are stored as follows. There is a list of agent control blocks 3410, each agent control block in the list corresponding to a format agent 320. Each agent control block 3410 can have a list of volume control blocks 3420 for volumes which have that format. Each volume control block 3420 can have a list of object control blocks 3430 for objects that are being accessed, and a list of iterator control blocks 3460 for the iterators which currently point to something on that volume. Each object control block 3430 can have a list of fork control blocks 3440 for forks which are opened for that object and a list of attribute filter control blocks 3470 for attribute filters which are opened for that object. Each fork control block 3440 can have a list of path control blocks 3450 for each access path which is opened for that object.

The volume control block 3420 is associated with a volume object (VO) 3425, the file system object control block 3430 is associated with an FSObject object (OO) 3435, the path control block is associated with a path object (PO) 3455, and the iterator control block 3460 is associated with an iterator control block (IO) 3465. These objects are assigned to the dispatcher message port and are used for communicating between the dispatcher and the APIs.

The structures of the agent control block, volume control block, object control block, fork control block, path control block, and iterator control block are described in the aforementioned U.S. patent application entitled "Method and System for Extending Metadata".

Figure 3B:
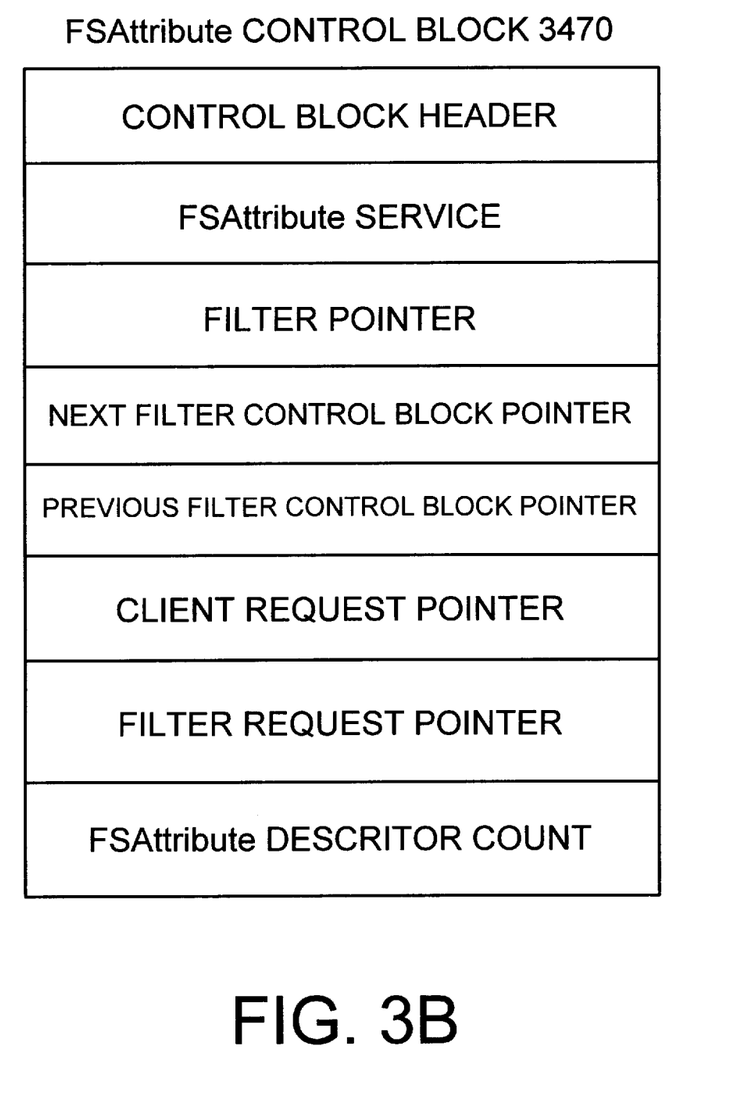
FIG. 3b illustrates an attribute filter control block according to one embodiment of the present invention.

One embodiment of the attribute filter control block 3470 has the structure illustrated in FIG. 3b, including the following fields: Control Block Header; FSAttribute Service; Filter Pointer; Next Filter Control Block Pointer; Previous Filter Control Block Pointer; Client Request Pointer; Filter Request Pointer; FSAttribute Descriptor Count. The Control Block Header contains fields that are common to the other types of control blocks, as described in the aforementioned U.S. patent application entitled "Method and System for Extending Metadata" Ser. No. 08/644,872 pending application. The FSAttribute Service field contains the value of a specific FSAttribute service. The Filter Pointer field associates the value of the FSAttribute service with the logic code in the filter. The Next Filter Control Block Pointer points to the next filter in the ordered list of filters, and the Previous Filter Control Block Pointer points to the previous filter in the ordered list of filters. The Client Request Pointer points to the primary FSAttribute Descriptor array in the client's request, described below with regard to FIG. 5d. The Filter Request Pointer points to the secondary FSAttribute Descriptor array in a request from the filter, also described below with regard to FIG. 5d. The FSAttribute Descriptor Count field indicates the number of FSAttribute Descriptors that have been added to the secondary FSAttribute Descriptor array by the filter.

Figure 4:
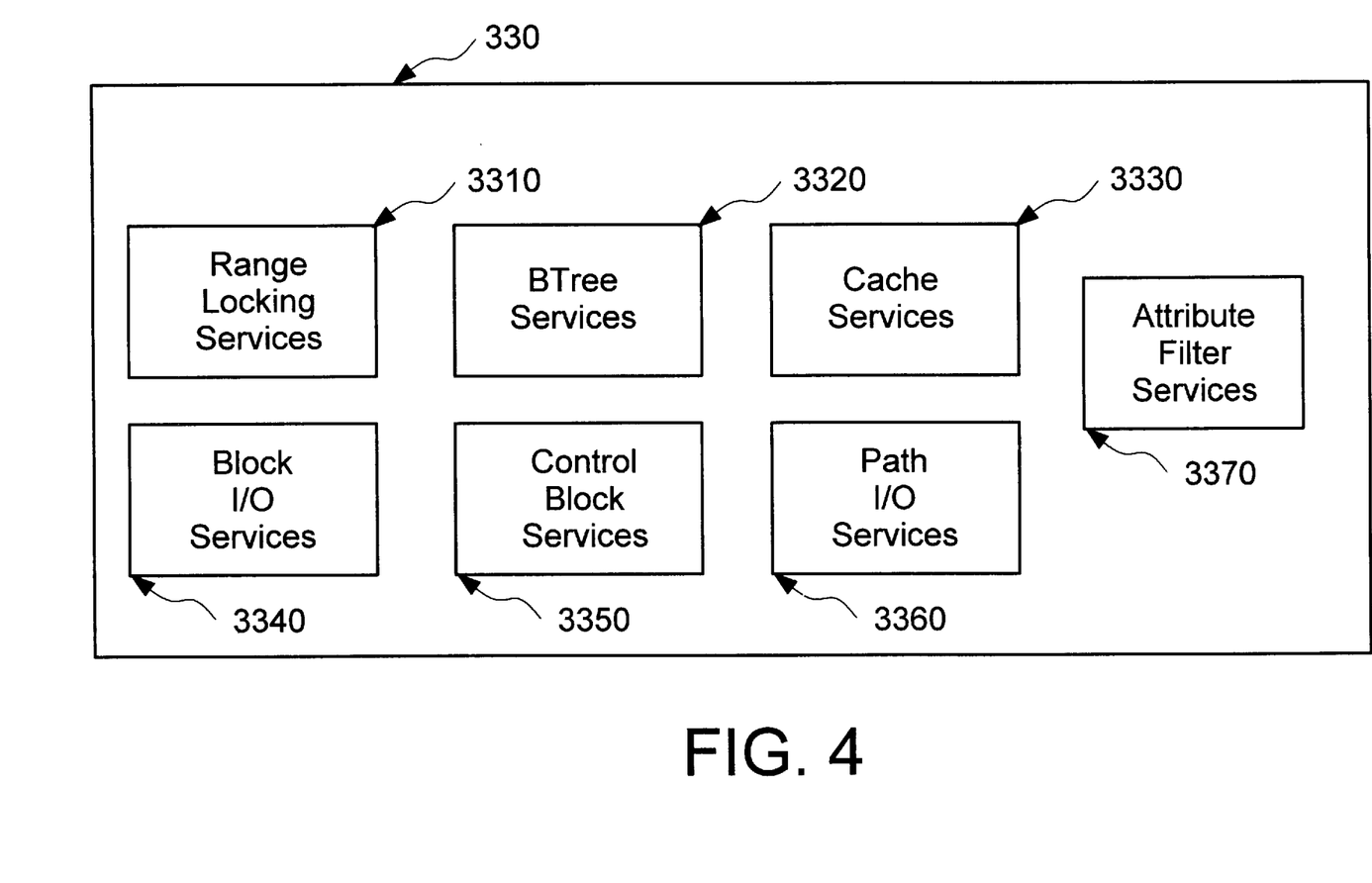
FIG. 4 illustrates a shared library according to the present invention.

FIG. 4 is a block diagram of the shared library 330 according to one embodiment of the present invention. The shared library 330 contains six logical code modules: a range locking services module 3310, a Btree services module 3320, a cache services module 3330, a block input/output (I/O) services module 3340, a control block services module 3350, a path I/O services module 3360, and an attribute filter services module 3370. Details of the shared library 330 are given in the above referenced patent application entitled "Method and System for Extending Metadata" Ser. No. 08/644,872 pending application.

Figure 5A:
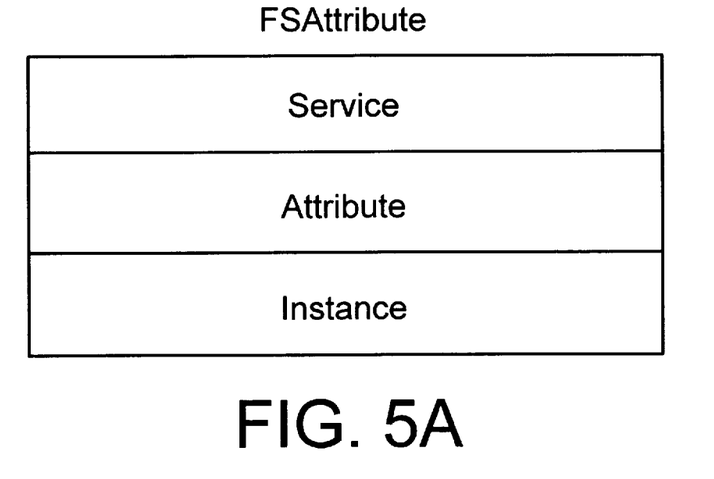
FIG. 5a illustrates a file system attribute structure according to one embodiment of the present invention.

FIG. 5a illustrates an exemplary structure of a file system attribute (FSAttribute) according to one embodiment of the present invention. The FSAttributes are included in the client's request. Referring to FIG. 5a, a FSAttribute includes a Service field, an Attribute field, and an Instance field. The Service field identifies the entity which defines a set of attributes. For example, the Service field may contain data indicating that an attribute set is defined by an outside vendor, such as Microsoft™ Corporation or its product Excel™. The Attribute field defines a group of discriminators, defined by the Service, that identify the attribute out of the set of attributes provided by the Service.

The Service field and the Attribute field describe a single piece of metadata. For example, for a color attribute, the Service field may indicate a set of Apple-defined colors, and the Attribute field may define the color to be red.

The Instance field indicates a particular instance of the attribute. Thus, for example, if the Service field identifies colors created by Apple, Inc., and the Attribute field defines the color to be red, the Instance field may identify a particular shade of red. Other FSAttributes defining an Apple created color red contain other instances indicating other shades of red.

Figure 5B:
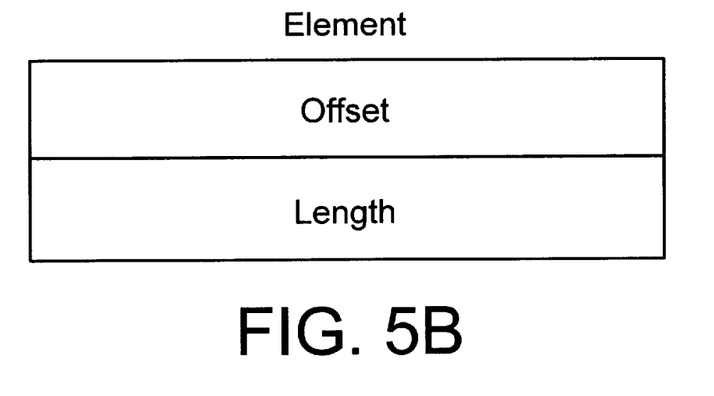
FIG. 5b illustrates a data element descriptor structure according to one embodiment of the present invention.

FIG. 5b illustrates a data element descriptor structure according to one embodiment of the present invention. The data descriptor, or Element Descriptor, indicates where an attribute value is located relative to its storage space and how long it is. The Element Descriptor contains an Offset field indicating where the attribute value begins relative to its storage space and a Length field indicating how many bytes the attribute value consumes.

Figure 5C:
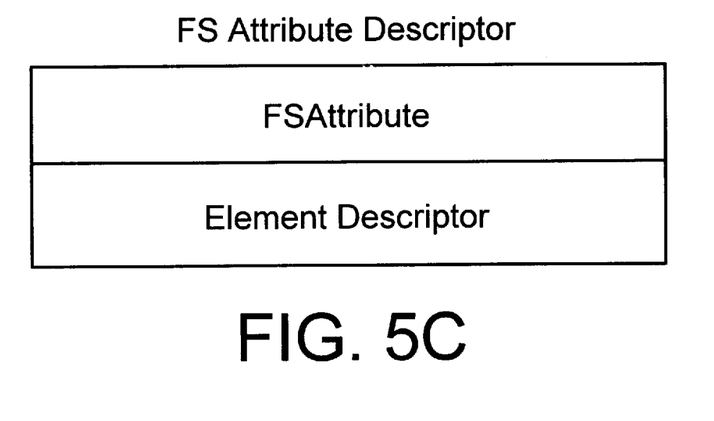
FIG. 5c illustrates a file system attribute descriptor structure according to one embodiment of the present invention.

FIG. 5c illustrates a file system attribute descriptor structure according to one embodiment of the present invention. Referring to FIG. 5c, an FSAttribute Descriptor includes an FSAttribute and its Element Descriptor. The FSAttribute Descriptor is provided in the client's request to retrieve or store attribute values.

Figure 5D:
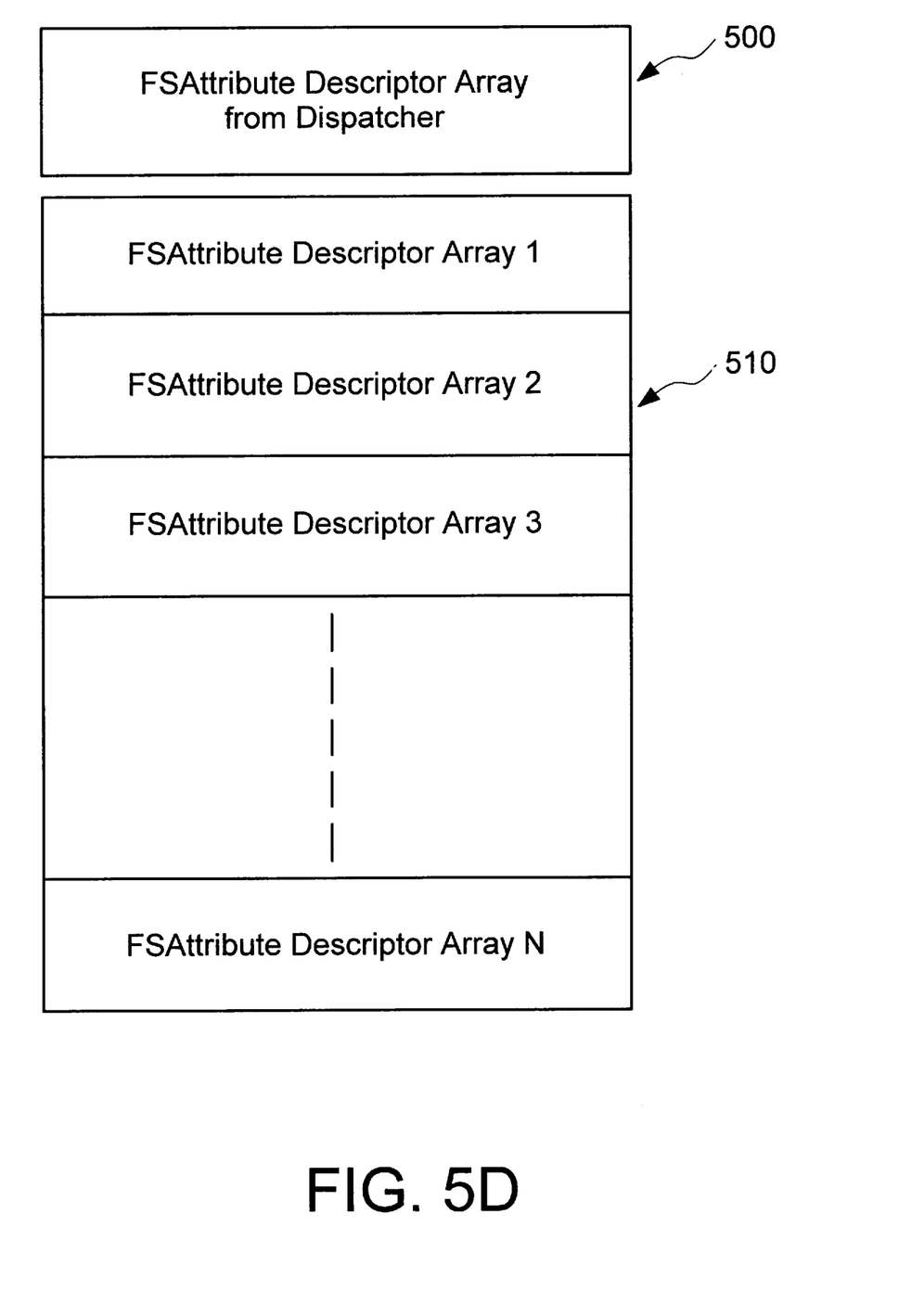
FIG. 5d illustrates a primary client file system attribute descriptor array and a secondary file system attribute descriptor array according to one embodiment of the present invention.

FIG. 5d illustrates a primary client file system attribute descriptor array and a secondary file system attribute descriptor array according to one embodiment of the present invention. The primary client FSAttribute Descriptor array 500 is provided by a client initiating a request via the dispatcher 300. The secondary FSAttribute Descriptor array 510 contains a plurality of FSAttribute Descriptors, 1 through N, each FSAttribute Descriptor provided by one of third party filters associated with a service in the filter system 370. The secondary FSAttribute Descriptor array 510 is used by the attribute filter system 370 to modify attribute values requested by the client and/or to compute attribute values. This is described in more detail below.

Although shown and described as separate from the primary FSAttribute Descriptor array 500, the secondary FSAttribute Descriptor array 510 can be appended onto the client's request, forming a single array.

Figure 6A:
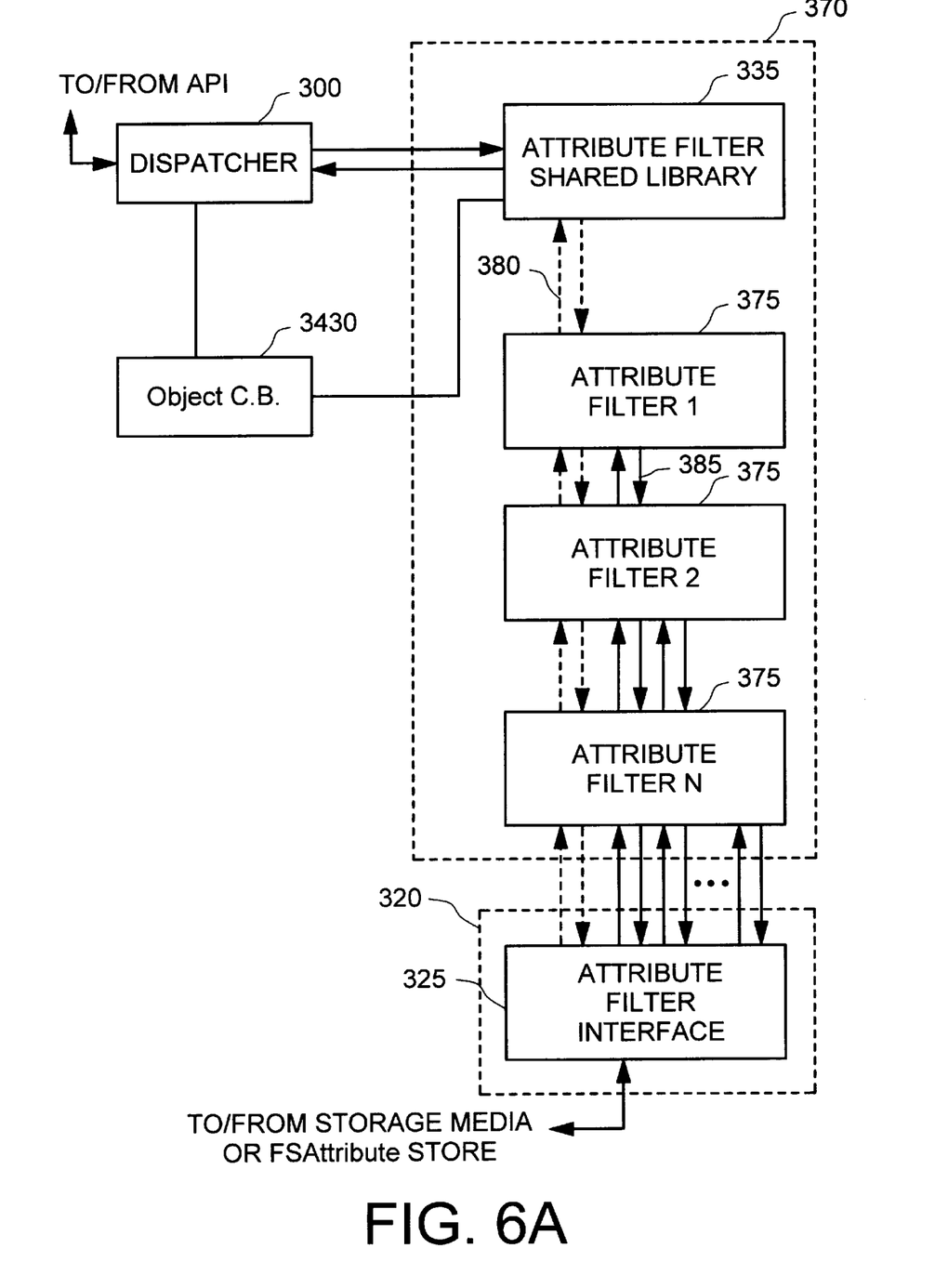
FIGS. 6a and 6b illustrate metadata flow diagrams for an attribute filter system according to the present invention.
Figure 6B:
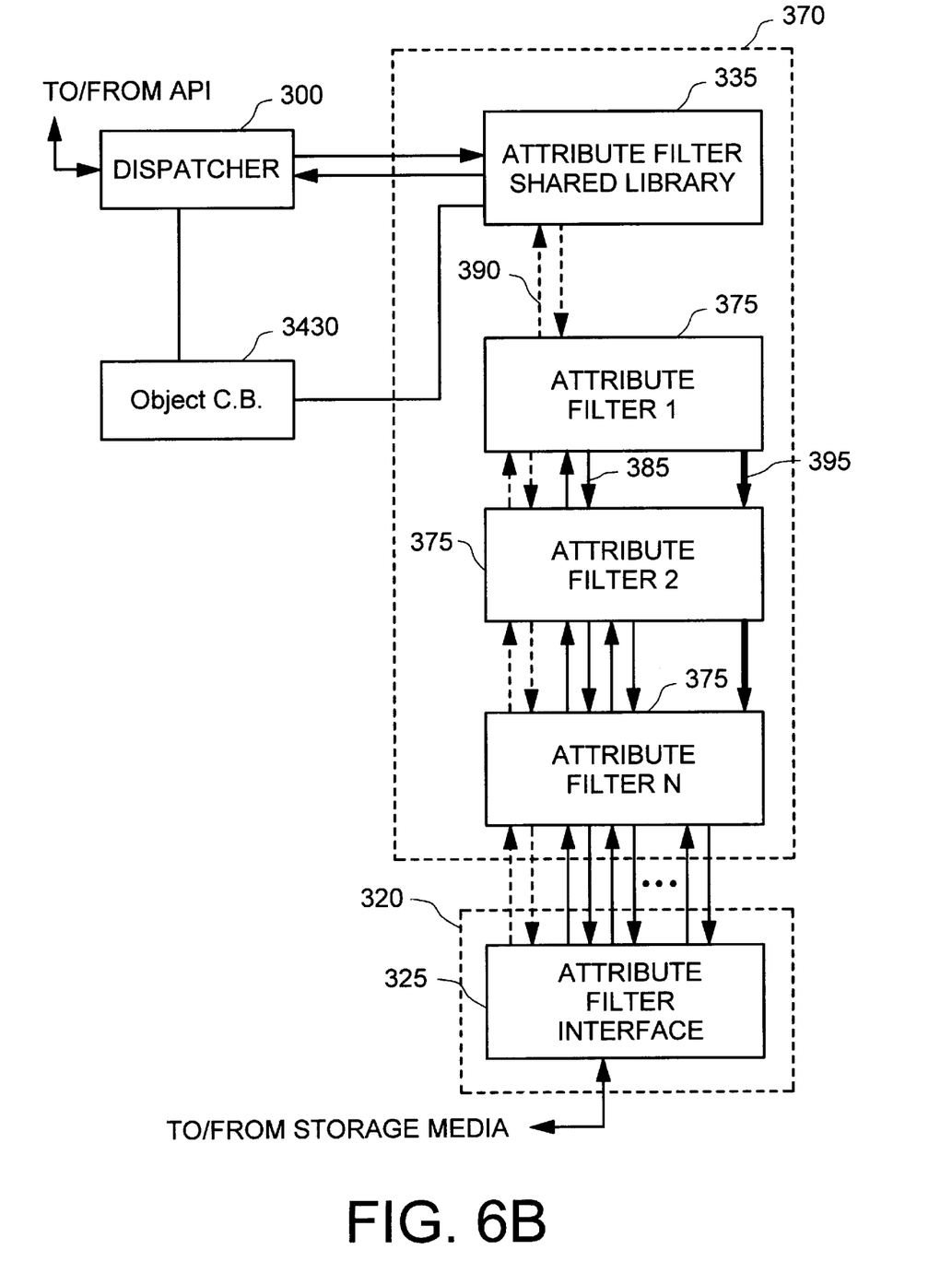

FIGS. 6a and 6b illustrate metadata flow diagrams for an attribute filter system according to the present invention. Referring to FIG. 6a, the dispatcher 300 is coupled to an object control block (object C.B.) 3430 in the dispatcher control store 340. The dispatcher 300 is also coupled to an attribute filter shared library 335, which may be included as the attribute filter services module as shown in FIG. 2.

The attribute filter shared library 335 is coupled to an attribute filter system 370 including the ordered chain of attribute filters 375, numbered 1–N. The attribute filters 375 are each associated with a third party service and are managed, independently of each other, by the attribute filter shared library 335. Each attribute filter 375 contains logic code for filtering, i.e., modifying and/or computing, the set of attribute values defined by its associated service.

The client's request is associated with an object via the object control block 3430 in the dispatcher control store 340 as described in the aforementioned U.S. patent application entitled "Method and System for Extending Metadata" Ser. No. 08/644,872 pending application. The FSAttribute Store 360 is checked to determine if there is a manifest filter attribute stored there, the value of which is an ordered list of filters. If there is a manifest filter attribute stored in the FSAttribute Store 360, the attribute filter shared library 335 is invoked, and the filters 375 are constructed, in order, by associating the services with the filters.

The attribute filter interface 325 is an interface that operates in the same manner as an attribute filter 375 but is actually part of a format agent 320. It is represented in this manner to illustrate that the attribute filters communicate with the format agent 320 as if it were another attribute filter.

The attribute filter interface 325 is coupled to the storage media associated with the format agent 320 or the FSAttribute Store 360, if needed, e.g., if the client's request concerns metadata that is not included in a format associated with the storage media.

The dispatcher 300 receives a request from a client for certain attribute values from a file system having a particular format. The request may be a "GET", which is a request to retrieve attribute metadata, or a "PUT", which is a request to modify or write attribute metadata.

FIG. 6a illustrates a "GET" process for retrieving attribute values from a file system according to one embodiment of the present invention. Referring to FIG. 6a, a request to retrieve attribute values is transmitted from a client to the attribute filter shared library 335 via the dispatcher 300. The client's request is illustrated in FIG. 6a as the dashed line 380. The client's request 380, which includes the primary FSAttribute Descriptor 500 array shown in FIG. 5d, is forwarded to the attribute filters 375. Each attribute filter 375 determines, as the client's request is passed down through the chain of filters, whether additional attribute values are needed to perform filtering of the attribute values that are to be retrieved. If an attribute filter determines that additional attribute values are needed, the attribute filter adds one or more FSAttribute Descriptors to the secondary FSAttribute Descriptor array 510 and sets the FSAttribute Count in the attribute filter control block to the number of FSAttribute Descriptors added. The attribute filter shared library 335 then passes the secondary FSAttribute Descriptor array along as a request 385. As shown in FIG. 6a, each attribute filter adds a request 385 for data needed to perform filtering.

The primary FSAttribute Descriptor array 500 and the FSAttribute Descriptor array 510 may be stored in a buffer in the system memory at each attribute filter 375. A series of separate buffers may be allocated at one time to store the entire secondary array and the primary FSAttribute Descriptor array. Alternately, a new buffer may be allocated each time the primary and the secondary FSAttribute Descriptor arrays exceed the capacity of a buffer. As an attribute filter 375 adds a new FSAttribute Descriptor to the secondary FSAttribute Descriptor array 510, the new FSAttribute Descriptor array is stored in a buffer according to the offset length.

The client's request 380, including the primary FSAttribute Descriptor array 500, and the request of the attribute filters 385, including the secondary FSAttribute Descriptor array 510, are passed down to the attribute filter interface 325 in the format agent 320. The format agent 320 fulfills portions of the requests 380 and 385 regarding attributes that are included in the file system format associated with the storage media directly from the storage media. Portions of the requests 380 and 385 regarding attributes that are not included in the file system format associated with the storage media are fulfilled from the FSAttribute Store 360, as described in the aforementioned U.S. patent application entitled "Method and System for Extending Metadata" Ser. No. 08/644,872 pending application.

The requested attribute values are retrieved from the FSAttribute Store 360 or the storage media. Then, the client's request 380 and the requests 385 of the filters are passed back up from the attribute filter interface 325. Each attribute filter filters the attribute values retrieved in response to the client's request 380 utilizing the attribute values requested by that filter. When an attribute filter is finished filtering, any FSAttribute Descriptors added to the FSAttribute Descriptor array 510 by that filter are removed by the attribute filter shared library 335, and the attribute filter shared library 335 decrements the FSAttribute Descriptor Count by the number of FSAttribute Descriptors removed. Buffer storage is deallocated as FSAttribute Descriptors are removed from the array 510. In this manner, a filter receives retrieved attribute values from preceding filters and passes modified attribute values or computed attribute values to succeeding filters. Finally, the retrieved attribute values, as filtered by the attribute filters 375, are returned to the client that initiated the request via the dispatcher 300.

FIG. 6b illustrates a "PUT" process for setting attribute values in a file system according to one embodiment of the present invention. Referring to FIG. 6b, a request to write or modify attribute values is transmitted from the dispatcher 300 to the attribute filter shared library 335. The request includes an FSAttribute Descriptor array 500 and values to set the attributes. The client's request is illustrated in FIG. 6b as a dashed line 390. The client's request 390 is transmitted from the attribute filter shared library 335 to the attribute filters 375.

Each attribute filter 375 determines, from the primary FSAttribute Descriptor array 500 in the client's request, whether additional attribute values are needed to perform filtering of the attribute values in the client's request. If, for example, attribute filter 1 determines that additional attribute values are needed to filter the attribute values in the client's request, attribute filter 1 adds one or more FSAttribute Descriptors to the secondary FSAttribute Descriptor array 510 and increments the FSAttribute Descriptor Count in the attribute filter control block. Then, the attribute filter shared library passes the array 510 along as a request 385 to the next filter. Each attribute filter adds FSAttribute Descriptors and increments its FSAttribute Descriptor Count as necessary.

The request 385 is passed down to the attribute filter interface 325 in the format agent 320, and the format agent 320 fulfills the request as described above for the "GET" process. The requested attribute values are then passed back up from the attribute filter interface 325 through the attribute filters 375. Any FSAttribute Descriptors added to the FSAttribute Descriptor array 510 by an attribute filter are removed at that attribute filter by the attribute filter shared library 335, which decrements the FSAttribute Descriptor Count accordingly. Thus, in effect, attribute filter 1 issues a "GET" request for additional attribute values needed to filter attribute values contained in the client's request. This "GET" request is handled in the manner described above with regard to FIG. 6a.

Once the secondary FSAttribute Descriptor array 510 is passed all the way back up through the attribute filters to the attribute filter that initiated the request for attribute values (in this example, attribute filter 1), the attribute filter filters the attribute values included in the client's request and passes the filtered attribute values to the next attribute filter as a request to set data, illustrated in FIG. 6b as a heavy solid line 395. The client's original request to set data is also passed to the next filter as a request 390.

The next attribute filter (in this example, attribute filter 2) determines whether it needs additional attribute values to filter the attribute values contained in the client's request, and if so, initiates a new "GET" request, which is handled in the manner described above with reference to attribute filter 1. Upon receiving the fulfilled "GET" request, attribute filter 2 filters the attribute values contained in the client's request, and the filtered attribute values are then passed to the next filter as a request 395, along with the client's original request 390.

The next attribute filter in the chain determines whether additional attribute values are needed to filter the attribute values contained in the client's request, and initiates a "GET" request as described above for attribute filters 1 and 2. This cycle of "GET" requests is repeated for every attribute filter in the chain, down to attribute filter N.

Once attribute filter N filters the attribute values contained in the client's request, the filtered attribute values are passed along with the client's request 390 to the attribute filter interface 325 in the format agent 320. The format agent 320 fulfills portions of the request 390 regarding attributes that are included in the file system format associated with the storage media directly from the storage media. Portions of the request 390 regarding attributes that are not included in the file system format associated with the storage media are fulfilled from the FSAttribute Store 360. The filtered attribute values are set in the file system or the FSAttribute Store 360, and a message indicating that the request has been fulfilled is returned to the client.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. In a computer including at least one client and at least one file system having an associated format, a system for filtering metadata requested by the client, the system comprising:

interface means for receiving a client's request for metadata from said at least one file system;

dispatch means for receiving the request from said interface means;

format agent means for fulfilling said request; and third party filter means for filtering by at least one third party said requested metadata in a manner that is transparent to the client.

2. The system of claim 1, wherein said filter means modifies said requested metadata and/or computes metadata based on said requested metadata.

3. The system of claim 1, wherein said filter means determines if metadata is needed to perform said filtering, and if metadata is needed, said filter means requests additional metadata and said format agent fulfills the client's request and the request of the filter means.

4. The system according to claim 1, further comprising:

storage means for storing metadata, wherein said format agent means fulfills portions of the client's request and the request of the filter means regarding metadata which is contained in the associated format of said at least one file system directly from the file system and accesses said storage means to fulfill portions of the client's request and the request of the filter means regarding metadata which is not included in the associated format of said at least one file system.

5. The system according to claim 1, wherein said request is to write or modify metadata, and said filter means filters met data to be written or modified by said format agent.

6. The system according to claim 1, wherein said request is to retrieve metadata, and said filter means filters metadata retrieved by said format agent.

7. In a computer including at least one client and at least one file system having an associated format, a method for filtering metadata requested by the client, the method comprising the steps of:

receiving a client's request for metadata from said at least one file system;

forwarding the request to a filter means;

routing the request to a format agent managing said at least one file system, wherein said format agent fulfills said request; and filtering, by at least one third party, the requested metadata in a manner that is transparent to the client.

8. The method of claim 7, wherein the step of filtering comprises modifying the requested metadata and/or computing metadata based on the requested metadata.

9. The method of claim 7, further comprising the steps of determining if metadata is needed to perform said filtering and requesting the additional metadata if it is determined that metadata is needed to perform said filtering, wherein said format agent means fulfills the client's request and the request for additional metadata.

10. The method according to claim 7, further comprising the steps of:

fulfilling portions of the client's request and the request for additional metadata regarding metadata contained in said associated format of said at least one file system; and accessing a storage means to fulfill portions of the client's request and the request for additional metadata regarding metadata that is not contained in said associated format of said at least one file system.

11. The method according to claim 7, wherein said request is to write or modify metadata, and said step of filtering filters metadata to be written or modified by said format agent.

12. The method according to claim 7, wherein said request is to retrieve metadata, and said step of filtering filters metadata retrieved by said format agent.

* * * * *

UNITED STATES PATENT AND TRADEMARK OFFICE
CERTIFICATE OF CORRECTION

PATENT NO. : 5,832,501
DATED : November 3, 1998
INVENTOR(S) : Kain, III, et al.

It is certified that error appears in the above-identified patent and that said Letters Patent is hereby corrected as shown below:

In the claims:

In Claim 5, at column 12, line 24, delete "met data" and insert --metadata--.

Signed and Sealed this

Eleventh Day of May, 1999

*Attest:*

Q. TODD DICKINSON

*Attesting Officer*    *Acting Commissioner of Patents and Trademarks*